United States Patent [19]

Resconi et al.

[11] Patent Number: 5,516,866
[45] Date of Patent: May 14, 1996

[54] CRYSTALLINE COPOLYMERS OF PROPYLENE

[75] Inventors: Luigi Resconi, Milan; Enrico Albizzati, Arona; Romano Mazzocchi, Pernate, all of Italy

[73] Assignee: Montell Technology Company bv, Netherlands

[21] Appl. No.: 279,671

[22] Filed: Jul. 25, 1994

Related U.S. Application Data

[63] Continuation of Ser. No. 114,995, Aug. 31, 1993, abandoned, which is a continuation of Ser. No. 928,081, Aug. 13, 1992, abandoned, which is a continuation of Ser. No. 733,059, Jul. 17, 1991, abandoned, which is a continuation of Ser. No. 598,781, Oct. 18, 1990, abandoned, which is a continuation of Ser. No. 275,129, Nov. 22, 1988, abandoned.

[30] Foreign Application Priority Data

Nov. 27, 1987 [IT] Italy ................... 41012 A/87

[51] Int. Cl.$^6$ .......................... C08F 210/16; C08F 4/642
[52] U.S. Cl. ...................... 526/348.6; 526/348; 526/160
[58] Field of Search ................... 526/348, 348.6

[56] References Cited

U.S. PATENT DOCUMENTS

| | | | |
|---|---|---|---|
| 4,048,409 | 9/1977 | Sugita et al. | 526/348 |
| 4,250,285 | 2/1981 | Minami et al. | |
| 4,367,322 | 1/1983 | Shiga et al. | 526/348.6 |
| 4,483,971 | 11/1984 | Sato et al. | 526/348.6 |
| 4,668,753 | 5/1987 | Kashiwa et al. | 526/348 |
| 4,769,510 | 9/1988 | Kaminsky et al. | 526/160 |
| 4,952,649 | 8/1990 | Kioka et al. | 526/348 |

FOREIGN PATENT DOCUMENTS

| | | |
|---|---|---|
| 0038119 | 6/1984 | European Pat. Off. . |
| 0145014 | 6/1985 | European Pat. Off. . |
| 0184324 | 6/1986 | European Pat. Off. . |
| 8605794 | 10/1986 | European Pat. Off. . |
| 0074194 | 11/1986 | European Pat. Off. . |
| 0129368 | 7/1989 | European Pat. Off. . |
| 0185918 | 9/1989 | European Pat. Off. . |
| 076947 | 6/1979 | France . |
| 2701647 | of 0000 | Germany . |
| 51-79195 | 7/1976 | Japan . |
| 62-121707 | 6/1987 | Japan ................... 526/348 |
| 2027720 | 6/1979 | United Kingdom . |

OTHER PUBLICATIONS

Translation of Japanese Kokai No. 62–121707.
"New Trends in the Field of Propylene Based Polymers", Polymer Journal vol. 17, No. 1, pp. 37–55 (1985), P. Galli et al.
"Composition–properties relationships in propene–ethene random copolymers obtained with high–yield Ziegler–Natta supported catalysts", Maurizio Avella et al., Makromol. Chem. 187, 1927–1943 (1986).
"Synthesis of Isotactic Polypropylene in a Bubble Column with a Homogeneous Ziegler–Natta Catalyst", H. Drogemuller et al., Polymer Reaction Engineering, 299–306 (1986).
"Structure–Properties Relationships in Some Random Copolymers of Propylene", Guidetti et al., vol. 19, No. 9, pp. 757–759 (1983), Eur. Polym. J.
Dissertation of Klaus Kulper, "Polymerization Characteristics of Soluble, Ring–substituted Zirconocene (IV) Dichlorides and Methylalumoxane and of other Catalyst with respect to 1–olefins", Hamburg, Germany, pp. 1–179, 1985.

*Primary Examiner*—Edward J. Smith
*Attorney, Agent, or Firm*—Bryan Cave

[57] ABSTRACT

Novel crystalline copolymers of propylene with minor proportions of ethylene and/or alpha-olefins, endowed with very good mechanical properties, a low melting point and a limited solubility in xylene at 25° C., and the process for preparing them by means of the polymerization of mixtures of propylene with ethylene and/or alpha-olefins of suitable composition, by using catalysts obtained from stereorigid and chiral compounds of zirconium, and methylalumoxanic compounds.

4 Claims, No Drawings

CRYSTALLINE COPOLYMERS OF PROPYLENE

This application is a continuation of application Ser. No. 08/114,995, filed Aug. 31, 1993, which is a continuation of application Ser. No. 07/928,081, filed Aug. 13, 1992, which is a Continuation of application Ser. No. 07/733,059, filed Jul. 17, 1991, which in turn is a Continuation of application Ser. No. 07/598,781, filed Oct. 18, 1990, which in turn is a Continuation of application Ser. No. 07/275,129, filed Nov. 22, 1988, all now abandoned.

The present invention is concerned with new crystalline copolymers of propylene, and with the process for preparing them.

Those skilled in the art know that polypropylene can be modified by introducing small amounts of comonomers, mainly ethylene and 1-butene, during the polymerization reaction. The purpose of this modification is of lowering the melting point of the polymer, and hence obtaining films showing improved characteristics of weldability.

However, the polymers obtained by means of the processes known to date suffer from the drawback of a non-homogeneous distribution of the comonomers; this causes the polymers to show high solubility characteristics in cold xylene, and the manufactured articles obtained from them to have decreased mechanical properties.

From European patent application N. 0 185 918, polymerizing propylene with stereospecifc catalysts is known, wherein such stereospecific catalysts are obtained from stereorigid and chiral compounds of zirconium, such as ethylene-bis-indenyl-zirconium dichloride, and ethylene-bis( 4,5,6,7-tetrahydroindenyl)zirconium dichloride, and from methylalumoxanic compounds.

The catalysts are also used in the polymerization of mixtures of propylene with ethylene or other olefins, with copolymers being obtained which, in the examples, are rich of ethylene and are soluble in xylene, and show an isotactic configuration of the propylenic sequences.

The present Applicants have unexpectedly found now that by using catalytic systems obtained from:

a) a stereorigid and chiral compound of zirconium of formula

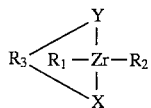

wherein $R_1$ and $R_2$ halogens or alkyl groups of from 1 to 6 C atoms;

X and Y are asymmetrical single-ring or multi-ring organic groups;

$R_3$ is a linear group of from 1 to 4 C atoms, or a cyclic group containing from 3 to 6 C atoms;

b) an alumoxanic compound of formula

with n being comprised within the range of from 2 to 25; or

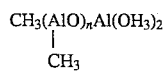

with n being comprised within the range of from 1 to 25; propylene copolymers with minor amounts of ethylene and/or alpha-olefins $$CH_2=CHR$$

wherein R is an alkyl radical of from 2 to 20 C atoms, which are endowed with a high crystallinity, and with very good mechanical properties (very similar to propylene homopolymer), have a melting point comprised within the range of from 110° to 140° C. and show a limited solubility in cold xylene (soluble polymer fraction in xylene at 25° C. lower than 10%, can be obtained if the polymerization of the monomers is carried out under conditions under which the formed copolymer has a composition similar to the composition of the monomers present in the gas phase.

The present Applicants have found, and this is an at all unexpected aspect of the present invention, that the composition of the copolymers is similar to that of the mixture of the monomers present in the gas phase, when the content of the monomers which are not propylene of said mixture is comprised within the range of from 2 to 10 mol %.

More particularly, in case of copolymers with ethylene, the ethylene content in the gas-phase mixture is comprised within the range of from 2 to 6 mol %; in case of propylene-ethylene-butene terpolymers, the content of ethylene and butene is comprised within the range of from 2 to 10 mol %.

By operating under the above stated conditions, copolymers are obtained, in which the distribution of the comonomers is perfectly homogeneous. This is demonstrated, in case of the copolymers with ethylene, by the analysis by means of $^{13}C$—N.M.R.: the presence is not observed of the characteristic signals of the sequences of more than one ethylene units, as described in Macromolecules 10 (3) 536 (1977).

The preparation of the copolymers by using the above stated catalysts is carried out by operating both in the gas phase and in the liquid phase (in the presence of a solvent consisting of an inert hydrocarbon, or in liquid propylene). The composition of the gas phase, comprised within the above stated critical range, is maintained constant during the polymerization. For example, in case of polymerization of propylene-ethylene mixtures by operating in liquid propylene, a constant overpressure of ethylene is maintained.

On the contrary, in case the polymerization is carried out in the gas phase, or in the presence of an inert hydrocarbon solvent, a gaseous mixture of the monomers with a constant composition is fed. The polymerization is carried out at temperatures lower than 20° C., and preferably comprised within the range of from 0° to 10° C.

The copolymers obtained by operating under the above stated conditions have an intrinsic viscosity in tetralin at 135° C. higher than 0.2 dl/g. As already stated, the copolymers are mainly used in the field of films; this, thanks to the high weldability characteristics of the films obtained from them.

The following examples are given for the purpose of merely illustrating the invention, without limiting it.

EXAMPLES 1–8

Polymethylalumoxane synthesis

To a flask of 500 ml of capacity, equipped with thermometer, bubble-condenser with stopcock connected to the gas meter, 100-ml dripping funnel, nitrogen stopcock and magnetic stirrer, 44.5 g of $Al_2(SO_4)_3 \cdot 18H_2O$ and 200 ml of toluene are charged under a nitrogen atmosphere, and to the dripping funnel 60 ml of pure trimethyl-Al is charged.

The nitrogen supply is discontinued, the connection to the gas meter is opened and, at room temperature, trimethyl-Al is rapidly added dropwise to the suspension of $Al_2(SO_4)_3 \cdot 18H_2O$, with this latter being kept vigorously stirred.

The temperature rises up to 55° C.; it is increased up to 60° C. by means of a heating bath, and is maintained constant at this value. The reaction is complete after 4 hours. The suspension is filtered, and the solution is dried: 15.8 g of product, corresponding to a yield of 44% is obtained.

Cryoscopic average molecular weight 1,160; average oligomerization degree 20.

Zirconium compound synthesis

The synthesis of ethylene-bis-indenyl-$ZrCl_2$ (EBIZ) and of ethylene-bis(tetrahydroindenyl)-$ZrCl_2$ (EBTHIZ) was carried out according to Journal of Organometallic Chemistry (1985) 288, 63.

Polymerization

All operations were carried out under nitrogen.

To a three-neck flask equipped with bubbling tube, thermometer and gas vent stopcock, with mechanical stirring means, and kept at the controlled temperature of 0° C. a solution of 20 ml of toluene, containing 45 mg of polymethylalumoxane and 0.8 mg of zirconium compound is charged.

After evacuating nitrogen, the gas mixture, the composition of which is specified in the following Table, is continuously added (flow rate 20 liters/hour).

The polymerization time, the catalyst type and the characteristics of the polymer are shown in the Table.

Comparative Example 1

To a glass autoclave of 300 ml, under a propylene stream a solution of 150 ml of toluene containing 350 mg of polymethylalumoxane is charged, the temperature of the autoclave is adjusted at the controlled value of 0° C., and then 5 mg of EBTHIZ dissolved in toluene is injected. The pressure inside the autoclave is increased up to 4 atm, and the polymerization is allowed to proceed for 4 hours at 0° C., 30.5 g of polymer is obtained, the data of which is reported in the Table.

Comparative Example 2

The process is carried out as in Example 1, with the exception that as the zirconium compound, EBIZ is used (the data relevant to the polymer is reported in the Table).

Comparative Example 3

Example 7 of EP 0 185 918 is repeated, with 20 g being obtained of a polymer which contains 47 mol % of ethylene, with ($\eta$)=0.15 dl/g, and a fraction soluble in xylene at 20° C. of 81.3%.

On $^{13}C$—N.M.R. investigation, the polymer shows ethylenic sequences.

TABLE 1

| Example N. | Zr Compound | Gas composition (moles %) | | | Time (hours) | Yield (grams) | Copolymer Composition | | | $\eta$ (dl/dg) | T (°C.) | Fraction soluble in xylene at 20° C. % by weight |
|---|---|---|---|---|---|---|---|---|---|---|---|---|
| | | $C_2$ | $C_4$ | $C_3$ | | | $C_2$ | $C_4$ | $C_3$ | | | |
| Compar. 1 | EBTHIZ | — | — | 100 | 5 | 30.5 | — | — | 100 | 1.25 | 147 | 0 |
| Compar. 2 | EBIZ | — | — | 100 | 3 | 4.7 | — | — | 100 | 0.68 | 144 | 0 |
| 1 | EBTHIZ | 2 | — | 98 | 2 | 1.40 | 2.6 | | | 1.34 | 134.9 | 0.16 |
| 2 | EBIZ | 2 | — | 98 | 2 | 0.75 | 2.8 | | | 0.72 | 132.3 | 0.0 |
| 3 | EBTHIZ | 3.5 | — | 96.5 | 2 | 3.10 | 3.5 | | | 1.6 | 129.6 | 2.5 |
| 4 | EBIZ | 3.5 | — | 96.5 | 2 | 1.90 | 3.2 | | | 0.9 | 128.1 | 2.0 |
| 5 | EBTHIZ | 5 | — | 95 | 2 | 1.40 | 5.4 | | | | | |
| 6 | EBIZ | 5 | — | 95 | 2 | 5.25 | 4.4 | | | 0.60 | 123 | 2.22 |
| 7 | EBTHIZ | — | 5 | 95 | 2 | 0.48 | | 5.4 | | 1.40 | 125 | 5.5 |
| 8 | EBIZ | — | 5 | 95 | 2 | 1.25 | | 5.9 | | 0.46 | 125 | 5.3 |

We claim:

1. Crystalline copolymers of propylene with ethylene, the ethylene content of said crystalline copolymers of propylene being from 2 to 10 mole %, said crystalline copolymers of propylene having a melting point of from 110° to 140° C., a solubility in xylene at 25° C. lower than 10% by weight, and a distribution of said ethylene such that no consecutive ethylene sequences are detectable through $^{13}C$—N.M.R. analysis.

2. Crystalline copolymers of propylene according to claim 1, containing from 2 to 6 mole % of ethylene and having a melting point of from 120° C. to 135° C.

3. Crystalline copolymers of propylene according to claim 1, containing from 2 to 10 mole % of ethylene and butene.

4. Crystalline copolymers of propylene according to claim 1, having an intrinsic viscosity in tetralin at 135° C. higher than 0.2 dl/g.

* * * * *